Nov. 18, 1969　　　　M. P. EHRLICH　　　　3,479,608
METHOD AND MEANS FOR STORING AND RELEASING ENERGY BY
STIMULATED EMISSION OF ELECTROMAGNETIC RADIATION
Filed Oct. 15, 1964
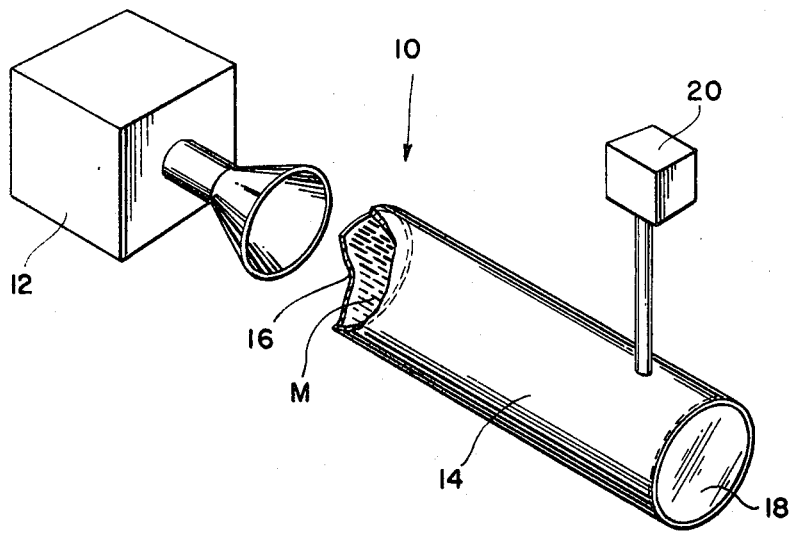
INVENTOR.
MELVIN P. EHRLICH
BY Jerome Bauer
ATTORNEY.

United States Patent Office 3,479,608
Patented Nov. 18, 1969

3,479,608
METHOD AND MEANS FOR STORING
AND RELEASING ENERGY BY STIMU-
LATED EMISSION OF ELECTROMAG-
NETIC RADIATION
Melvin P. Ehrlich, Hicksville, N.Y., assignor to NRA,
Inc., New Hyde Park, N.Y., a corporation of New York
Continuation-in-part of application Ser. No. 52,247,
Aug. 26, 1960. This application Oct. 15, 1964, Ser.
No. 406,214
Int. Cl. H01s 1/06
U.S. Cl. 330—4                      5 Claims

ABSTRACT OF THE DISCLOSURE

An arrangement for providing coherent energy outputs by means of transitions between "spin states" of hydrogen molecules. The invention utilizes thermodynamic techniques to pump diatomic hydrogen so that a large majority of such hydrogen molecules are in their metastable energy-storing state. In such a state, these molecules may be subjected to appropriate short wavelength radiation to thereby stimulate them and controllably cause the molecules to make the energy-releasing transition from their higher to their lower energy states.

---

This application is a continuation-in-part of application Ser. No. 52,247, filed Aug. 26, 1960 and now abandoned.

This invention relates to methods and means for storing and controlling the release of energy.

It is well known that changes in the excited state of a molecule or an atom may occur not only by collision with other molecules or atoms, but also by the absorption or emission of radiation. A change in the excited state of a molecule or an atom results in the release or absorption of a quantum of energy. One device employing the principle of controlled release of energy by changing the state of a molecule is generally referred to as a MASER type amplifier.

The term "MASER" is an acronym for "Microwave Amplification by Stimulated Emission of Radiation." The basis of operation of the MASER type amplifier is to populate or elevate by some pumping means, molecules or electrons from a lower to a higher energy state. In a MASER type amplifier, for example as disclosed in U.S. Patent No. 2,879,439 of Mar. 24, 1959, an ammonia ($NH_3$) molecule is utilized. This material is contained in a resonant microwave cavity, pumped up to a higher energy state by electrostatic or electromagnetic means and is stimulated by an incoming electromagnetic signal to cause the ammonia molecules to change from the high energy metastable state to a lower energy state. The transition of the molecules from a higher energy state to a lower energy state results in an emission of electromagnetic radiation. It has been calculated that the period of time which it takes for the material employed in MASER type amplifiers to change from their metastable state to their lower energy state is in the order of approximately $10^{-7}$ seconds without being stimulated by any exterior source. Hence, it becomes difficult to work with and utilize the materials of the MASER type amplifier devices for any purpose involving a reasonably large energy storage and emission of radiation. This, in fact, is the difficulty with MASER type amplifiers. There is no feasible manner of storing energy for reasonably long and useful periods unless unusual pumping methods are utilized.

It is the purpose and object of the present invention to contain in a resonant or non-resonant cavity, a relatively large volume of material, of which a large proportion of its molecules or atoms are in a metastable state. It is another object of this invention to employ a material that requires a relatively longer time for the transition of its molecules or atoms from the metastable higher energy state to their lower energy state than materials heretofore utilized.

It is also an object of this invention to provide methods and means for controllably stimulating such materials to cause the molecules or atoms thereof to change from their higher energy state to their lower energy state to produce a controlled release of energy in an electromagnetic form as radiation.

Still another object of the invention is to provide means whereby the molecules or atoms of materials have population inversions which occur as a result of the mechanical application of different temperatures.

Other objects and features of my invention reside in the structures and arrangements hereinafter more fully described with reference to the accompanying drawing in which:

The single figure is a diagrammatic view of means for storing and controlling the release of energy.

Referring to the drawing, the device there shown is referred to as an amplifier and is generally identified by the numeral 10. Device 10 comprises an electromagnetic source 12 and a resonant or non-resonant cavity or chamber 14 having transparent end walls 16 and 18. Connected with the chamber 14 is a mechanical pumping apparatus of any well known construction, as a cryostat 20.

Those skilled in the art will recognize that there exists in nature materials whose molecules or atoms have what is sometimes referred to as excited states which may be metastable. These molecules or atoms react in various ways according to the temperatures to which they are subjected. Under certain temperature conditions, the excited states of certain molecules or atoms become metastable. For purposes of explanation, those materials referred to herein are all materials having population inversions which occur at different temperatures. These would include materials having spin states, electronic states and vibrational states.

Hydrogen and hydrogen chloride are among the materials whose molecules are known to have high energy metastable spin states. Hydrogen is a diatomic molecule. Gaseous hydrogen at room temperature has essentially two nuclear spin states. These are more commonly referred to as the para and ortho states of hydrogen. At room temperature there is a ratio of seventy-five (75%) percent ortho state hydrogen to twenty-five (25%) percent para state hydrogen. It is noteworthy that when hydrogen is cooled or liquified, this ratio of ortho state to para state molecules continues to exist. However, the ortho spin state has a higher quantum energy level than the para spin state and the para state hydrogen molecule is more stable than is the ortho.

Consequently, as a transition or change occurs in a hydrogen molecule from the ortho state to the para state, the ortho state hydrogen molecule spontaneously emits a photon of electromagnetic radiation energy. Because a period of hours is normally required to spontaneously accomplish this transition or change from the ortho state to the para state as compared to the material employed in the MASER type devices, whose known spontaneous transition from the metastable state to the lower energy state is in the order of $10^{-7}$ seconds, hydrogen and hydrogen chloride, for example, are more readily usable for the controlled emission of electromagnetic radiation and the release of such stored energy.

In accomplishing the controlled emission of electromagnetic radiation energy, advantage is thus taken of the slower spontaneous transition period of, for example, the hydrogen molecules. By stimulating the molecules of hydrogen from their ortho to their para states, it should be possible to achieve a release of stored energy. The period of release should be in the order of $10^{-8}$ seconds when the material is properly stimulated to change from its ortho state to its para state, as compared to relatively longer periods involving hours of normal spontaneous transition.

In operation, there is normally a greater proportion of ortho state hydrogen molecules than para state hydrogen molecules in a material such as hydrogen at room temperature. However, by passing the hydrogen or hydrogen containing material through a mechanical device such as the pumping apparatus or cryostat 20 and subjecting the material to a temperature different from room temperature, more especially a lower temperature, the number of quantum states of the molecules of the material can be reduced to two, thus placing the material in its metastable state. This material M is transferred from apparatus 20 and contained in the chamber 14 of the amplifier device 10 between the transparent end walls 16 and 18. As aforementioned, under normal conditions it would require hours for the ortho state hydrogen molecules to spontaneously change their state to para state hydrogen molecules. However, by stimulating the rapid transition of ortho state hydrogen molecules to the para state hydrogen molecules, it is possible to obtain a very rapid release of energy in the form of photons at a wavelength of approximately eighty (80) microns.

In the present invention the stimulation of the transition of the ortho state hydrogen molecules is accomplished by the introduction of an electromagnetic signal. This signal may be transmitted by any suitable means, such as the source 12 illustrated in the drawing. Here, the source 12 is directed at the transparent end wall 16 of the chamber 14 so that an RF signal will act, without interference, upon the ortho state hydrogen molecules contained in the chamber 14. It is necessary to select the proper RF transition frequency required to cause the transition of the ortho state hydrogen molecules. The ortho state hydrogen molecules can be caused to change rapidly to the para state by stimulating the same with electromagnetic radiation of the same wavelength as their transition wavelength. The transition wavelength of the ortho state hydrogen molecules to the para state is in the order of eighty (80) microns. Hence, the stimulating RF signal emanating from the source 12 will have a wavelength of eighty (80) microns.

The ortho state hydrogen molecules contained in the end of the chamber 14 at the transparent end wall 16 are stimulated by the electromagnetic radiation emanating from the source 12. When so stimulated, they rapidly change to the para state and emit a photon. The emitted photon interacts with other ortho state molecules to stimulate the same and to release their photon during their transitions to the para state. This transition of ortho state hydrogen molecules occurs rapidly in-phase along the length of the material M contained in the chamber 14, building up in the release of energy in the form of photons, which is directed out of the chamber 14 through the transparent end wall 18 thereof. As noted previously, this stimulated in-phase transition of ortho state hydrogen molecules to para state hydrogen molecules and release of energy has been computed to occur within a period of approximately $10^{-8}$ seconds.

It will be recognized that as the proportion of ortho state hydrogen molecules is increased with respect to para state hydrogen molecules of the material M contained in the chamber 14, the release of energy may be enhanced. The hydrogen molecules of the material here suggested are susceptible of being stored in approximately the one hundred (100%) percent ortho state and they are then capable of being stimulated for in-phase transition along the length of the stored material M, it being recognized that the resultant release of energy through the transparent end wall 18 will be monochromatic.

Therefore, the invention teaches methods and means for controlling the release of energy by containing an energy storing material in a resonant or non-resonant cavity whereby the material, such as hydrogen or hydrogen chloride, will have a larger proportion of its molecules or atoms in their energy storing state than in their non-energy storing state and will be of such nature that the normal period of transition required for the change of the molecules thereof from their energy storing state to their non-energy storing state is relatively long. The transition of energy storing molecules is capable of being stimulated to cause the same to change from their energy storing state to their non-energy storing state. This very rapid stimulated transition results in a release of energy as the energy storing molecules are stimulated from one end of the mateiral M in chamber 14 to the opposite end thereof. This stimulation and rapid transition, whereby the energy storing molecules are caused to release their energy, is accomplished by the application of an electromagnetic signal to the one end of the material M, the frequency of the signal being the same as the transition frequency of the energy storing molecules.

It is within the contemplation of this invention that the introduced RF signal acting upon the energy storing molecules to cause the same to change from their higher energy storing state to their non-energy storing state, can be controlled in duration. Therefore, by controlling the duration or amplitude of the introduction RF signal, it may be possible to control the number of energy storing molecules that may be caused to change to their non-energy storing state, thereby resulting in a controlled amount of energy that will be released by the contained material. Consequently, it is believed that if the introduced radiating RF signal is of short duration or amplitude, only a proportionate amount of the energy storing molecules of the contained material will be stimulated to change their non-energy storing state and to release their energy. The remaining energy storing molecules not so stimulated by the RF signal will, therefore, not be stimulated to return to their non-energy storing state and will be left to their spontaneous transition. Thus, it will be recognized that the remaining energy storing molecules not stimulated to change to their state may once more be stimulated by a subsequent RF signal that may be introduced.

It must be noted, therefore, that because the material here employed comprises molecules which require a relatively long spontaneous transition period from their higher energy storing metastable state to their non-energy storing state, it is believed possible to stimulate only a portion of such molecules in their metastable state to return to their non-energy storing state while additional ones of such molecules may be stimulated at different times by an RF signal causing the same to change and release their energy in accordance with the amount of radiation to which they are subjected. Thus, the intensity of introduced radiation will correspondingly control the molecules to be changed from their energy storing state to their non-energy storing state and thereby enable a control of the amount of energy released. However, it is conceivable and possible that once the transition of molecules or atoms from their higher energy storing state has been stimulated, there may occur an avalanche effect of stimulation and transition of all higher energy storing molecules or atoms that will not stop or respond to a stimulation of short duration by the source 12.

The materials employed herein having population inversions which occur as a result of the mechanical application of different temperatures also make it convenient to mechanically recharge the same by circulation through the pumping apparatus 20 to return the molecules thereof to their high energy storing metastable state after the same have been stimulated to change to their non-energy storing state. It is recognized that the mechanical recharging of the material M is susceptible of accomplishment even while the same is contained in the chamber or cavity 14. Quite recognizably, thereof, the suggested materials may be continually used over and over again merely by processing the same to return the molecules thereof to their high energy storing metastable state.

Those skilled in the art will readily recognize that the present invention may be employed as an oscillator simply by replacing the transparent walls 16 and 18 with reflective surfaces to produce a resonant cavity or chamber 14.

While there have been shown and described and pointed out the fundamental novel features of the invention as applied to several preferred embodiments thereof, it will be understood that various omissions and substitutions and changes in the form and details of the devices illustrated and in their operations may be made by those skilled in the art, without departing from the spirit of the invention. It is the intention, therefore, to be limited only as indicated by the scope of the claims appended hereto.

What is claimed is:

1. A device for controlling the release of energy from a medium having molecules chaarcterized by nuclear spin states comprising a chamber containing said medium in at least a first higher energy state corresponding to a plurality of quantum states, means for lowering the temperature of said medium to reduce the total number of probable quantum states in said chamber and to increase the transition probability of said molecules and means for introducing energy into said chamber to cause stimulated emission of energy therefrom by the transition of said molecules from said first higher energy state to a second lower energy state.

2. A device as defined in claim 1 wherein said medium includes molecules having at least two identical atoms, and including means for separating said first higher energy state and second lower energy state molecules of said medium to increase the relative population in said chamber of said molecules in said first state.

3. A device as defined in claim 2 wherein said medium is diatomic hydrogen, said first and second energy states comprising orthohydrogen and parahydrogen respectively and wherein said temperature lowering means reduces said number of probable quantum states to two.

4. In a method for controlling the release of energy from a medium including molecules having at least two identical atoms, the steps of placing a quantity of said medium having a greater proportion of high energy rotation state molecules to low energy rotation state molecules in a chamber, reducing the temperature of said medium in said chamber to increase the ground state probability of said high energy rotation state molecules and introducing energy into said chamber to stimulate the transition of said high energy rotation state molecules to the low energy rotation state whereby said medium then has a greater proportion of low energy rotation state molecules to high energy rotation state molecules.

5. A method as defined in claim 4 including the step of separating said high energy and low energy rotation state molecules after said temperature reducing step and before said energy-introducing step to enhance the population of said high energy rotation state molecules.

References Cited

UNITED STATES PATENTS

| | | | |
|---|---|---|---|
| 3,015,072 | 12/1961 | Schulz-DuBois et al. | 330—4 |
| 3,210,673 | 10/1965 | Hoffman | 332—7.5 |
| 3,255,423 | 6/1966 | Ramsey et al. | 330—4 |

ALFRED L. BRODY, Primary Examiner

DARWIN R. HOSTETTER, Assistant Examiner

U.S. Cl. X.R.

330—4.3; 331—94, 94.5